United States Patent [19]
Dahlberg et al.

[11] Patent Number: 5,503,647
[45] Date of Patent: Apr. 2, 1996

[54] MUSHROOM CASING SPAWN

[75] Inventors: Kurt R. Dahlberg, Napoleon; Dena L. LaPolt, Bowling Green, both of Ohio

[73] Assignee: Campbell Soup Company, Camden, N.J.

[21] Appl. No.: 139,873

[22] Filed: Oct. 22, 1993

Related U.S. Application Data

[63] Continuation-in-part of Ser. No. 820,128, Jan. 14, 1992, abandoned.

[51] Int. Cl.⁶ .................................................. A01G 1/04
[52] U.S. Cl. ........................................ 47/1.1; 71/5
[58] Field of Search ............................ 47/1.1, 1.102, 47/1.107; 71/5

[56] References Cited

U.S. PATENT DOCUMENTS

| | | | |
|---|---|---|---|
| 3,828,470 | 8/1974 | Stoller | 47/1.4 |
| 3,940,883 | 3/1976 | Kasahara et al. | 47/1.1 |
| 3,942,969 | 3/1976 | Carroll, Jr. et al. | 71/5 |
| 4,079,543 | 3/1978 | Stoller | 47/1.1 |
| 4,127,964 | 12/1978 | Mee | 47/1.1 |
| 4,170,842 | 10/1979 | Stoller | 47/1.1 |
| 4,443,969 | 4/1984 | Hanacek et al. | 47/1.1 |
| 4,534,781 | 8/1985 | Wu et al. | 71/5 |
| 4,803,800 | 2/1989 | Romaine et al. | 47/1.1 |
| 4,818,268 | 4/1989 | Holtz | 71/5 |
| 4,996,390 | 2/1991 | Dahlberg | 800/220 |
| 5,048,227 | 9/1991 | Okubo et al. | 47/1.1 |

FOREIGN PATENT DOCUMENTS

| | | |
|---|---|---|
| 0290236 | 11/1988 | European Pat. Off. |
| 58/212722 | 12/1983 | Japan |
| 2146319 | 4/1985 | United Kingdom |
| WO88/01472 | 3/1988 | WIPO |
| WO93/13647 | 7/1993 | WIPO |

OTHER PUBLICATIONS

H. Tonomura, in "The Biology and Cultivation of Edible Mushrooms", ed. by S. Chang & W. Hayes, Academic Press, NY, 1978, pp. 408–421.

G. Gramss, in "The Biology and Cultivation of Edible Mushrooms", ed. by S. Chang & W. Hayes, Academic Press, NY, 1978, pp. 423–443.

T. Ito, in "The Biology and Cultivation of Edible Mushrooms", ed. by S. Chang & W. Hayes, Academic Press, NY, 1978, pp. 461–473.

Hermans, C., et al. Champignoncultuur, vol. 33 (1989) pp. 295–303 (abstract).

Fritsche, G., "Breeding Work", in Chang, S. and Hayes, W., The Biology and Cultivation of Edible Mushrooms (New York, Academic Press, 1978) pp. 244–246.

Leuanon, D., et al. The Mushroom Journal, vol. 161 (1986) pp. 151–159.

Bretzloff, C. W., "A Quantitative Method For the Study of Mushroom Nutrition in the Laboratory", Reprinted from Mushroom Science V, 1962, pp. 241–246.

Hermans, et al., "CAC–ING, Or Cover Dirt That Has Been Inoculated II" [Cac–ing ofwel geent afdekken II], De Chapignon–cultuur, 1989, 33:295–303.

Visscher, H. R. "Substitutes for Peat in Mushroom Casing Soil," The Mushroom Journal, 1982, 118:353–358.

Kalberer, P., "Influence of Casing Layer Depth and Harvesting Time on Changes of the Water Content of the Casing Layer and the Substrate Caused by the First Flush of Mushrooms," The Mushroom Journal, 1984, 135:99–105.

Nair, et al., "An Alternative Method of Nutrient Supplementation In the Cultivation Of the Common Mushroom Agaricus Bisporus", Australian Journal Of Experimental Agriculture, 1993, 33:115–117.

Romanens, et al., "Cac'ing Safer with Cac'ing Spawning," Der Champignon, 1989, pp. 22–30.

Primary Examiner—David T. Fox
Assistant Examiner—Charles Rories
Attorney, Agent, or Firm—Banner & Allegretti, Ltd.

[57] ABSTRACT

The present invention provides an improved casing spawn that reduces the time between casing and the onset of mushroom production. The casing spawn is prepared from particles containing no available nutrients and with a substantial capacity to hold moisture (nutritionally inert particles). The particles are amended with sufficient nutrients to support the growth of *Agaricus bisporus* mycelium but less than the amount known to inhibit mushroom primordium formation or allow mold growth. A mixture of these ingredients is moistened, sterilized, and inoculated with *Agaricus bisporus* mycelium. Following incubation to allow full colonization of the mixture, the colonized material is mixed with casing material in order to inoculate mushroom casing layers. The invention provides a fully functional casing spawn without sacrificing mushroom bed volume or risking the transmission of diseases to the crop.

5 Claims, 3 Drawing Sheets

MUSHROOM CASING SPAWN

This application is a continuation-in-part of U.S. application Ser. No. 07/820,128, filed Jan. 14, 1992, now abandoned.

BACKGROUND OF THE INVENTION

1. Field of the Invention

This invention deals with improvements in CACing, a method of increasing productivity of mushroom beds by shortening the time required to produce a new crop of mushrooms.

2. Review of Related Art

Mushroom production proceeds via a sequence of steps. First, the nutritive medium (compost) is inoculated with mushroom mycelia by distributing particulate material colonized with mushroom mycelia (spawn) through it, and then the compost is colonized by the mycelium. Mushroom spawn is generally made from sterilized grain that is inoculated with pure cultures of the desired mushroom strain. Next, the colonized compost is covered by a layer of nutrient poor material (easing). The mycelium proceeds to colonize this layer, and once the easing layer is colonized, the mycelium in this nutrient poor environment produces fruiting bodies. These fruiting bodies are harvested and sold as commercial mushrooms.

The time-consuming stages of mushroom production are the periods when the farmer is waiting for the mycelia to colonize a new material. One way that has been used to accelerate the process is to mix precolonized material, such as colonized compost, into the casing layer on top of the compost in the bed, after the compost layer is colonized with mushroom mycelia. Overall production time is reduced, because growth of the mycelia into the casing starts at many points throughout the casing layer rather than just at the interface with the colonized compost. By including a small amount of colonized material in the nutrient-poor casing layer, the casing layer is colonized more quickly and the farmer can produce a crop in a shorter time, thereby increasing his capacity without capital investment. This procedure is referred to as "CACing" (Compost At Casing).

Although the CACing procedure accelerates production to increase capacity for a fixed volume of mushroom bed, the colonized compost that is added to the casing layer as inoculum must come from somewhere. If it comes from the farmer's own beds, then he loses capacity equal to the amount of bed volume used to provide the casing inoculum. Another problem with using locally developed inoculum is controlling quality. If the compost is weakly colonized, then the CACing procedure will not increase the rate of colonization enough to compensate for the loss of bed capacity. Even worse, because this supplemental inoculum is not sterilized, it has the potential for spreading infection by contaminating organisms throughout the mushroom house thereby reducing the productive capacity of the house.

Some farmers have attempted to solve these problems by inoculating the casing layer with the same spawn that is used to inoculate the compost layer. Spawn for inoculating the compost layer is produced by mixing mushroom mycelia with sterile grains and incubating to allow colonization of the grain. The grain spawn has a consistent level of live mycelial content, but it has relatively high nutrient content (contributed by the grain). In order to be effective, the inoculum must be supplied at relatively high levels and the resultant nutrient level in the casing layer inhibits formation of mushroom primordia (fruiting bodies). It also increases the potential for growth of contaminating organisms by providing them with nutrients that are normally absent from the casing layer.

Spawn makers have tried to produce a "casing spawn" which contains low levels of nutrients and has been sterilized to eliminate pathogens and pests, but the products currently available are not effective. Stoller, U.S. Pat. No. 3,828,470, teaches spawn in which the cereal substrate has been diluted with an inorganic material containing calcium carbonate or an organic flocculating agent. Romaine, et al., U.S. Pat. No. 4,803,800, teaches production of casing spawn by encapsulation of the nutrients in a hydrogel polymer.

SUMMARY OF THE INVENTION

It is an object of the present invention to provide a mushroom casing spawn to inoculate mushroom casing layers and minimize the time between casing and the onset of mushroom production.

It is a further object of this invention to provide a casing spawn with a minimum level of nutrients such that mushroom primordium formation is not inhibited by elevated nitrogen content of the product.

It is a further object of this invention to provide a casing spawn that is fully sterilized before inoculation with *Agaricus bisporus* to eliminate the possibility of transmitting diseases or pests.

It is yet another object of this invention to provide a casing spawn with small particles to provide the maximum number of points of inoculation in the mushroom casing layer.

These and other objects are met by the present invention which comprises an improved casing spawn support which is made with: (a) nutritionally inert particles carrying absorbed water; and (b) nutrient particles that will provide growth nutrients for the mycelium but low enough to avoid inhibiting primordium development while minimizing growth of weeds, pest molds, and pathogens. Casing spawn according to the invention generally contains 10–99 wt % inert particles, 1–20 wt % nutrient particles, and 35–60 wt % water. Preferably, the spawn contain 35–55 wt % inert particles, 5–15 wt % nutrient particles, and 40–50 wt % water. This spawn reduces the time between casing and the onset of mushroom production.

The casing spawn is prepared from particles containing no available nutrients and with a substantial capacity to hold moisture (nutritionally inert particles). The particle size, and consequently the number of points of inoculation in CACing, is regulated by the choice of particulate ingredient. The particles are amended with sufficient nutrients to support the growth of *Agaricus bisporus* mycelium but less than the amount known to inhibit mushroom primordium formation or allow mold growth. A mixture of these ingredients is moistened, sterilized, and inoculated with *Agaricus bisporus* mycelium. Following incubation to allow full colonization of the mixture, the material is used by mushroom growers as a "casing spawn" to inoculate mushroom casing layers.

The invention provides a fully functional casing spawn without sacrificing mushroom bed volume or risking the transmission of diseases to the crop.

The present invention also provides a mushroom inoculum with unexpectedly long stability and resistance to mycelial overgrowth after storage in a range of temperatures. The invention is expected to provide a method for long term storage of *Agaricus bisporus* strains without risk of deterioration or loss of vigor.

While the primary intended purpose of this invention is to provide a means of inoculating the mushroom casing layer with actively growing *Agaricus bisporus* mycelium in order to facilitate colonization of the casing layer, the material of this invention may also be used as an inoculum support for a wide range of filamentous fungi for a number of purposes. These include, but are not limited to: inoculation of compost with *Agaricus bisporus* mycelium; inoculation of substrates for other mushroom fungi, including Pleurotus spp., Lentinula spp., etc.; and inoculation of other fungi into solid substrates.

DETAILED DESCRIPTION

As disclosed, the present invention comprises an inoculum for *Agaricus bisporus,* other Basidiomycetes, including other mushroom genera and species, or other fungi. The casing spawn is formulated in such a manner as to minimize the nutrient content of the substrate while providing sufficient nutrients to allow vigorous vegetative growth of the fungus.

San Antonio (1971, *Mycologia,* 63:16–21) has shown that traditional mushroom spawn based on rye, millet, or other grains can support mushroom production. If a peat moss easing layer is added to the surface of the spawn in an appropriate container, and the eased spawn is treated according to standard practices known to induce mushroom formation, mushrooms (fruiting bodies) will form. A successful synthetic mushroom compost, by definition, must also support mushroom production under appropriate conditions.

A casing spawn may be distinguished from a "synthetic compost" in that casing spawn, according to the present invention does not support the production of *A. bisporus* mushrooms when used as a synthetic compost. Casing spawn formulas support excellent vegetative (or mycelial) growth of the mushroom fungus, but allow only minimal mushroom fruiting under permissive conditions.

Research leading to the present invention has shown that mycelial growth and mushroom fruiting are nutritionally distinguishable processes. Vegetative growth is dependent upon both carbon and nitrogen nutrients, with nitrogen generally being limiting. Fruiting, however, is almost totally dependent upon carbon nutrition. Complex polysaccharides such as cellulose, hemicellulose, and starch are substantially broken down in the mushroom compost during the fruiting process. The carbon liberated from these polysaccharides is transported to the developing mushroom, and is used to synthesize basidiocarp components such as mannitol, trehalose, glycogen, and other materials that comprise the mature mushroom. In the absence of abundant carbon in the substrate, primordia will be formed, but mature mushrooms will never develop. In the casing spawn formulas described herein, there is insufficient carbon to support more than slight mushroom production. The casing spawn formulas may, of course, be amended to provide additional carbon so that the formula will support fruiting, but that is not within the scope of the current invention.

NUTRITIONALLY INERT PARTICLES

The preferred embodiment of this invention is to use a nutritionally inert substrate with a high water holding capacity. The substrate consists of an insoluble, nutritionally inert, generally porous, generally hydrophilic, preferably mineral type particle. Its useful size range is between about 0.5 and 15 mm, preferably between 1 to 6 mm, and most preferably between 2 and 4 mm in average size. The specific shape of the particles does nor appear to affect the successful preparation of casing spawn. The typical formulation of calcined earth involves irregularly shaped particles that are generally about 1.5 to 4.0 mm in size. Water holding capacity should range between 0 g and 4 g/g dry weight (0 to 80% water content), preferably 0.2 to 3 g/g dry weight (16 to 75% water content), and most preferably 0.7 to 1.5 g/g dry weight (41 to 60% water content). While it is preferred that the nutritionally inert substrate is capable of holding water, the invention also contemplates a particulate substrate where water is held between the particles as a layer on the outside of the particles.

Materials that are useful as a casing spawn substrate are included in the following list. These may be used singularly or in combination with each other, and other suitable substrates would be readily apparent to one skilled in the art. Such substrates include, by manner of example, calcined earth, vermiculite, perlite, or other mineral material that exists or can be formulated into a particulate form. These substrates are effectively devoid of available carbon and nitrogen compounds. For example, minerals or clays can be prepared in a suitable manner by subjecting them to a calcination process, whereby they are heated to a temperature below their melting point to bring about a state of thermal decomposition. The calcination process results in a porous material that readily absorbs water and has virtually no residual organic material. Calcined earth is commercially available under the "Turface" and "Turface Plus" brand names. Functionally equivalent materials include "Oil Dry" (Agsorb® brand calcined earth, a product of the Oil-Dri Corporation of America) and eat litter box absorbents. Those skilled in the art can readily define additional materials that fulfill the definition of satisfactory substrates.

The useful content of the inert substrate in the casing spawn formulation is preferably between 10 and 99% of the dry weight of the casing spawn. The most preferred range for the content of the inert substrate is dependent upon the type of nutrient used. The substrate should be substantially free of nutrients, especially nutritionally available nitrogenous compounds, and provide minimal soluble salts, heavy metals, and other materials that may inhibit mycelial growth or present a handling problem to humans. A preferred, but not required attribute of the inert substrate is an absence of dustiness or other characteristics that would make handling difficult or dangerous.

NUTRIENTS

The nutritionally inert particles are placed in a suitable container and amended with nutrients known to support the growth of *Agaricus bisporus* mycelium. These nutrients include, but are not limited to, materials of known nutrient composition, formulations of various nutrients, or agricultural materials. The nutrients used in the casing spawn formulation are either of animal or vegetable origin or are mixed from defined chemical sources. They are generally proteinaceous in nature and usually are, or are derived from, seeds of grasses, grains, oilseeds, legumes, or other vegetable materials. Nutrient sources are typically agricultural materials available in commerce, and the nutrients described herein include, but are not limited to, materials which are generally recognized by those skilled in the art under the following names:

Soybeans, cracked soybeans, soybean fines, soybean dust, soybean meal, and other soybean based materials.

Similar nutrients obtained from cottonseed, canola, rapeseed, or other oilseed.

Similar nutrients obtained from corn, rye, millet, milo, wheat, or other grain.

Similar nutrients obtained from beans of all kinds and other legumes.

Casein

Gelatin

Keratin

Ground nuts

Sunflower seed

Corn gluten

Guar protein

Egg albumin

Corn steep liquor

Specific nutrient formulations, including those prepared from casein, casein hydrolysates, peptones, etc., as nitrogen sources; and various mono-, di- and oligo- and polysaccharides such as glucose, sucrose, starch, etc. as carbon sources. Formulations may also be amended with vitamin and trace mineral sources.

The amount of a nutrient required varies with the type of materials used. Several typical formulations are provided in Examples 1–21. The optimum level of nutrient is determined empirically. The empirical criteria used to establish the level of nutrients is that sufficient nutrients must be added to support the vigorous growth of *Agaricus bisporus* mycelium in the casing spawn substrate, but the nutrient content must be low enough to avoid inhibiting mushroom primordium development in the casing layer. Some nutrient levels are too rich to support the growth of *Agaricus bisporus*. For example, soybean fragments or soybean fines do not support good growth of the fungus when used undiluted with other materials.

Optimal casing spawn nutrient levels are defined functionally as the lowest level of nutrients that support good growth of *Agaricus bisporus* in the formulations such as those described in Examples 1 to 21. By formulating the product with the lowest effective nutrient level, the danger of inhibiting pinning (primordium formation) or allowing mold growth in the casing is minimized. The term "nutrient" is generally used to reflect nitrogenous materials that are readily available to *Agaricus bisporus* and to various weed and pest molds and pathogens.

The casing spawn formulations of this invention preferably have available Kjeldahl nitrogen contents of less than 1% although the nutrient component in the formulation may have a total Kjeldahl nitrogen level of 0.1–10%, preferably within the range of 0.3–10%, and most preferably a level of available nitrogen within the range of 0.3–1%. From the Examples below, Formula 1 has a Kjeldahl nitrogen content of 0.71%; Formula 2, 0.70%; Formula 3, 0.48%; Formula 4, 0.32%; etc. At the preferred use of rate of 0.1 lb/ft$^2$, Formula 1 delivers 0.18 g of nitrogen per square foot of casing area. Higher levels of nutrients in the casing spawn formula also support excellent mycelial growth, although there is a maximum permissible level of some nutrients. Levels that deliver above about 0.2 g available nitrogen/ft$^2$ of casing area progressively reduce mushroom yield when mixed with the casing layer. In particular, mushroom yield is reduced when the casing spawn formula contains greater than 0.7% of bioavailable Kjeldahl nitrogen.

It is important to distinguish available nutrients from non-available nutrients. Sphagnum peat moss frequently used in mushroom casing layers may contain from 0.75 to 3.5% Kjeldahl nitrogen (See, e.g., Fuehsman, C. H., "Peat and Water. Aspects of Water Retention and Dewatering in Peat." Elsevier, London, 1986). Hypnum, or "black" peat, contains significantly higher nitrogen levels. Both of these peats, however, support good fruiting of *Agaricus bisporus* when used as a casing material. The nitrogenous materials in peats are generally "humic" in character, such as lignin and other mineralized nutrients. These are not readily available to the mushroom fungus and most microorganisms capable of colonizing the casing layer. If additional nutritionally available nitrogen compounds are added to the casing layer, fruiting is inhibited.

Carbon compounds are generally not limiting in the casing layer or in the casing spawn formulas of this invention. Peat moss contains substantial levels of carbon in the form of cellulose. While the cellulose is somewhat recalcitrant to digestion by many microorganisms, it can be used as a carbon source by *Agaricus bisporus* if other carbon sources are not available.

PREPARING CASING SPAWN

The mixture of particles and nutrients is amended with water to or near its maximum water holding capacity. The water holding capacity of the mixture depends on the characteristics of all of its component ingredients. It is desirable that the casing spawn be a free-flowing powder. To retain this free-flowing character, the added moisture must be below the maximum level that can be dispersed within and around the particles before the particles begin to stick together and form "cakes."

Maintaining added water at or below the maximum water holding capacity of the casing spawn is also important to avoid free liquid in the bottom of the container. If the substrate is submerged, the lack of free gas exchange inhibits mycelial growth, resulting in a poorly colonized zone in the bottom of the spawn container. The "dead spot" would obviously reduce the efficacy of the product in inoculating casing layers. In addition, when sterile conditions are relieved, the poorly colonized area is subject to microbial attack. In practice, the moisture content of the casing spawn is between 35 and 60%, preferably 40 to 50%.

The mixture is typically amended with a small amount of calcium carbonate or lime to achieve a balanced pH, in the range of about pH=6.0–8.5, preferably 6.8 to 8.0 and most preferably 7.2 to 7.6 for *Agaricus bisporus*. These broad ranges would also be suitable for most other fungi, and those of ordinary skill in the art can easily optimize the pH of the casing spawn composition for these other fungi. Fungi are generally very tolerant to very low pH, and so this invention also contemplates support compositions that are acidified with organic acids, such as tartaric acid.

Containers suitable for holding the casing spawn mixture are known to those skilled in the art of mushroom spawn production. These may include glass or plastic containers with screw capped lids that can be fitted with a filter to exclude microorganisms but allow gas exchange. Other containers include plastic bags that are heat resistant and allow gas exchange while excluding foreign microbes, as well as bulk containers, or other enclosures. The use of the term "container" does not exclude very large bulk systems in which substrates are mixed, sterilized, inoculated, and incubated.

Containers holding the casing spawn mixture are sterilized by methods known to those skilled in the art. These methods may include the use of high pressure steam, Tyndallization (repeated exposure to high temperatures that individually do not result in complete sterilization), ionizing radiation, chemical sterilizing agents, or other method to eliminate all microorganisms. The objective of the treatment is to achieve the substantial elimination of all living organisms within the enclosed containers, preferably the total elimination of living organisms.

Following sterilization, containers holding the casing spawn mixture are cooled, vented, or otherwise returned to conditions favoring the growth of the desired microorganism, preferably *Agaricus bisporus*. Containers are briefly opened under aseptic conditions to allow the introduction of an inoculum of the microorganism, for example, the *Agaricus bisporus* mycelium. Containers are closed and incubated under environmental conditions favoring the growth of the microorganism in the inoculum. Similar procedures are used to inoculate and grow other fungi, including other Basidiomycetes, on the amended substrate of this invention. The following representative list provides examples of mushroom fungi suitable for inoculating the substrate.

*Agaricus bisporus*

*Agaricus bitorquis*

*Pleurotus ostreatus, P. sajor-caju,* and other members of the genus Pleurotus

*Lentinula edodes*

*Flammulina velutipes*

*Lepista nuda*

*Coprinus comatus*

*Stropharia rugoso-annulata*

*Volvariella volvacea*

Biocontrol fungi, including Trichoderma species, various mycorrhizal fungi, and a range of other fungi.

The inoculum used to introduce the *Agaricus bisporus* mycelium to the sterile casing spawn substrate is known to those skilled in the art or can be predicted from these disclosures. The inoculum can consist of *Agaricus bisporus* mycelium growing on sterilized grain, casing spawn (including the casing spawn embodied in this invention), other solid substrate, agar or other gelatinous substrate, or liquid medium. The casing spawn substrate is mixed or agitated to provide a uniform distribution of the inoculum and incubated under conditions known to favor *Agaricus bisporus* growth. The substrate may be again mixed or agitated several days after inoculation to distribute the mycelial growth and improve substrate colonization. Casing spawn is fully colonized 8 to 16 days after inoculation. The time to full colonization is dependent upon the amount of inoculum used, incubation temperature, the strain of Agaricus bisporus used, and a number of other variables.

USE OF CASING SPAWN

After full colonization with *Agaricus bisporus* mycelium, casing spawn may be transferred to other containers for storage or shipping, or may be used directly from the growth container. Casing spawn is used in CACing by mixing the material with a mushroom casing material prior to, during, or after the casing material is applied to the surface of mushroom compost. If mixed prior to casing, it is added to the mixer used to combine peat moss, lime, and water prior to casing. While it is believed that the best performance of casing spawn is achieved when it is added to the mixer after the other ingredients are fully mixed, satisfactory performance has also been achieved when all ingredients are mixed together at the same time.

If casing spawn is applied during casing, it can be added to a casing belt, continuous peat mixer, or other system that prepares and delivers the casing material to the surface of the compost. It is important that the casing spawn be mixed to achieve an even distribution within the casing layer.

If casing spawn is added after casing, it can be uniformly spread over the surface of the casing layer. In this ease, the casing spawn should be mixed with the casing layer with a rake, digging machine, or other tool to achieve a uniform distribution.

The optimum use rate for casing spawn is between 0.025 and 0.5 $lb/ft^2$ of bed surface area to be covered by the casing material, ideally 0.025 to 0.2 $lb/ft^2$. There is no detriment to using casing spawn rates of up to at least 0.5 $lb/ft^2$, but levels of over about 0.20 to 0.25 $lb/ft^2$ do not provide proportional benefits. The beneficial effects of casing spawn usage are proportionally reduced at rates below about 0.05 $lb/ft^2$, such that the decrease in time between casing and flushing is eventually lost. Similar use rates are effective for casing spawn inoculated with other fungi requiring a casing layer, such as Stropharia.

Using the casing spawn formulations described herein, little mycelial growth in the casing layer is observed for about the first 24 to 36 hours after casing. After this time, a careful inspection of the casing layer reveals that *Agaricus bisporus* mycelia begin to "fluff up" and can be observed on the casing spawn particles. Growth from the casing spawn particles as well as from the compost underlying the casing layer progresses until the mycelia growing from individual points of inocula begin to coalesce or anastomose. The mycelial growth in the casing layer rapidly "fills in" by about the fourth or fifth day after casing. The crop is ready to be flushed within 4 to 6 days after casing. This compares to the usual 9 to 11 or more days before flushing for mushroom crops in which the casing layer has been deep scratched or ruffled rather than inoculated with casing spawn. The precise time to flushing for mushroom crops inoculated with casing spawn varies with the amount of casing spawn used and environmental conditions imposed upon the crop during the period after casing.

The performance of casing spawn prepared according to the methods disclosed here is satisfactory for use after storage at 3 to 4 C for at least four months. Unexpectedly, casing spawn prepared according to the methods outlined herein is not subject to the type of overgrowth normally observed in grain spawn after storage for several weeks. Stored grain spawn continues to grow, even at reduced temperatures. As a consequence, the grain spawn is eventually overcome by heavy mycelial growth. This heavy growth causes difficulties in breaking up masses of spawn to allow an even distribution within the compost, and the spawn is perceived to be of unacceptable quality. Casing spawn of this invention does not show this heavy mycelial overgrowth, even after incubation at room temperature for several weeks. It is likely that the reduced nutrient levels in the casing spawn compared to grain spawn do not allow the continued heavy mycelial growth. The casing spawn is perceived to have a better quality after storage.

Because of the extended viability without mycelial overgrowth, casing spawn may be used for long term maintenance of mushroom cultures. This invention, therefore, provides a method of avoiding overgrowth (stroma) or "mushroom strain degeneration" that periodically occurs in *Agaricus bisporus* cultures.

Described below are examples of the present invention which are provided only for illustrative purposes. They are not intended to limit the scope of the present invention in any way, as numerous embodiments within the scope of the claims will be apparent to those of ordinary skill in the art in light of the present disclosure. Those of ordinary skill in the art are presumed to be familiar with (or to have ready access to) the references cited in the application, and the disclosures thereof are incorporated by reference herein.

EXAMPLE 1

Formula and Procedure for Casing Spawn Preparation

| Formula 1: | |
|---|---|
| Turface ® brand calcinated earth | 900 g |
| Soybean fines | 100 g |
| Calcium carbonate | 5 g |
| Water | 1000 ml |

Turface® brand calcinated earth may be used as purchased from the manufacturer. Soybean fines are a by-product of a manufacturing operation; the fines are small fragments of whole soybeans, typically passing through a 4.0 mm sieve and generally greater than 90% passing through a 2.0 mm sieve. The soybean fines typically have a Kjeldahl nitrogen content of about 7.0%. As formulated, this casing spawn has a nitrogen content of 0.7% on a dry weight basis, or about 30% of that normally observed in rye grain.

Ingredients were mixed together in a 160 fluid ounce glass bottle. The bottle was closed with a perforated metal closure fitted with a cellulose filter to allow gas transmission. The unit was sterilized by autoclaving at 128 C for 50 minutes. After cooling, the jar was inoculated with a culture of *Agaricus bisporus* strain M8 growing on rye spawn. The mixture was shaken in a modified commercial paint shaker immediately after inoculation to provide a satisfactory distribution of the inoculum, and incubated at 25 C.

After seven days, the mixture was again shaken, and incubation at 25 C continued. After a further seven days incubation, the resulting fully colonized casing spawn was used to inoculate a mushroom casing layer. In practice, shaking can be done between about 4 and 8 days. The best time depends on the growth rate, which is dependent on the specific mushroom strain, temperature, humidity, inoculation rate, and other variables. It is possible to make the casing spawn with no shaking, although the growth time is increased and quality of the spawn is reduced.

If not used immediately, the fully colonized casing spawn may be stored in the glass bottle at 1 to 4 C. Alternatively, the mixture may be again shaken, and the casing spawn may be transferred to perforated plastic bags for storage or shipment to commercial mushroom farms.

EXAMPLE 2

| Formula 2: | |
|---|---|
| Turface brand calcinated earth | 1000 g |
| Sucrose | 26.0 g |
| Casamino acids (Bacto) | 20.0 g |
| Yeast extract | 2.0 g |
| Vogel's Trace Element Solution | 2.0 ml |
| Water | 750 ml |

All ingredients are mixed and treated as in Example 1. Vogel's trace element solution is a mixture of micronutrients described by H. J. Vogel (*American Naturalist*, 98: 435–446, 1964). Its use in this formula is optional, but preferred in order to insure that all trace element requirements are met.

EXAMPLES 3–21

The ingredients in the following formulas are mixed and treated as in Example 1.

| Formula 3: | |
|---|---|
| Calcined earth (various brands) | 900 g |
| Cracked soybeans | 100 g |
| Calcium carbonate | 5 g |
| Water | To Near Saturation |
| Formula 4: | |
| Calcined earth (various brands) | 800 g |
| Rye grain or flour | 200 g |
| Calcium carbonate | 5 g |
| Water | To Near Saturation |
| Formula 5: | |
| Cat litter box absorbent | 900 g |
| Soybean fines | 100 g |
| Calcium carbonate | 5 g |
| Water | To Near Saturation |
| Formula 6: | |
| Vermiculite | 900 g |
| Soybean fines | 100 g |
| Calcium carbonate | 5 g |
| Water | To Near Saturation |
| Formula 7: | |
| Perlite | 900 g |
| Soybean fines | 100 g |
| Calcium carbonate | 5 g |
| Water | To Near Saturation |
| Formula 8: | |
| Coarse washed sand | 900 g |
| Soybean fines | 100 g |
| Calcium carbonate | 5 g |
| Water | To Near Saturation |
| Formula 9: | |
| Washed gravel | 900 g |
| Soybean fines | 100 g |
| Calcium carbonate | 5 g |
| Water | To Near Saturation |
| Formula 10: | |
| Ground corn cobs | 900 g |
| Soybean fines | 100 g |
| Calcium carbonate | 5 g |
| Water | To Near Saturation |
| Formula 11: | |
| Charcoal particles | 900 g |
| Soybean fines | 100 g |
| Calcium carbonate | 5 g |
| Water | To Near Saturation |
| Formula 12: | |

| | |
|---|---|
| Coarse hardwood sawdust | 900 g |
| Soybean fines | 100 g |
| Calcium carbonate | 5 g |
| Water | To Near Saturation |

Formula 13:

| | |
|---|---|
| Calcined earth (various brands) | 900 g |
| Cottonseed meal | 100 g |
| Calcium carbonate | 5 g |
| Water | To Near Saturation |

Formula 14:

| | |
|---|---|
| Calcined earth (various brands) | 900 g |
| Corn meal, corn dust, or ground corn | 100 g |
| Calcium carbonate | 5 g |
| Water | To Near Saturation |

Formula 15:

| | |
|---|---|
| Calcined earth (various brands) | 900 g |
| Navy bean outfall | 100 g |
| Calcium carbonate | 5 g |
| Water | To Near Saturation |

Formula 16:

| | |
|---|---|
| Calcined earth (various brands) | 900 g |
| Sunflower seed fragments | 100 g |
| Calcium carbonate | 5 g |
| Water | To Near Saturation |

Formula 17:

| | |
|---|---|
| Calcined earth (various brands) | 850 g |
| Malt extract | 150 g |
| Calcium carbonate | 5 g |
| Water | To Near Saturation |

Formula 18:

| | |
|---|---|
| Calcined earth (various brands) | 1000 g |
| V8 (R) brand vegetable juice | 200 g |
| Calcium carbonate | 20 g |
| Water | To Near Saturation |

Formula 19:

| | |
|---|---|
| Calcined earth (various brands) | 900 g |
| Casein | 100 g |
| Calcium carbonate | 5 g |
| Water | To Near Saturation |

Formula 20:

| | |
|---|---|
| Calcined earth (various brands) | 900 g |
| Corn gluten | 100 g |
| Calcium carbonate | 5 g |
| Water | To Near Saturation |

Formula 21:

| | |
|---|---|
| Calcined earth (various brands) | 1000 g |
| Corn steep liquor | 100 g |
| Calcium carbonate | 20 g |
| Water | To Near Saturation |

Turface brand calcined earth can be substituted with Turface Plus brand calcined earth, Oil-Dry clay absorbent (7/14, 4/8, 8/16, etc.), various brands of cat litter box absorbent, vermiculite, perlite, or other materials or mixture thereof. Minor adjustments in the formulas, especially in the amount of water added, may be needed to accommodate altered water holding capacities of the particles.

The soybean-based nutrient in Examples 1, 3 and 5–12 can be substituted with any one of a number of nutrients, including soybean hulls, soybean meal, many types of whole grains or grain flour, and other nutrients. The materials used in the formulas provided in these Examples are the commercial products which are generally available and recognized by those skilled in the art under the names used in the formulas. Those skilled in the art could readily formulate additional mixtures that would function in the capacity described in this disclosure.

The mixture of nutrients in the formula from Example 2 can be substituted with any one of a number of nutrient formulations. Those skilled in the art could readily formulate additional nutrient mixtures that would function in the capacity described herein.

*Agaricus bisporus* will grow well at a range of nutrient levels. For instance, the content of soybean fines described in the formula of Example 1 can be as little as 1–2% or as high as 50%. The optimum formula is one that provides sufficient nutrients to support the growth of *Agaricus bisporus* in the casing spawn while minimizing the amount of nutrients added to the mushroom casing layer. The optimum nutrient content is empirically determined. Substantially equivalent results are obtained when the formula of Example 1 contains 5 to 15% soybean fines.

The successful use of colonized compost for CACing requires that the casing strain be matched to the mushroom strain present in the compost. If homologous or very similar strains are not matched, the mushroom crop is affected by symptoms referred to as "strain incompatibility." Mushroom yield and quality are significantly affected by this incompatibility.

Strain incompatibility is a serious problem when the crop is CACed with compost, but tests have shown that it is less serious when using casing spawn of this invention. While the preferred mode of this invention uses casing spawn inoculated with the same strain as the underlying compost, it is contemplated that casing spawn inoculated with distinct strains may also be used. The lack of strain antagonism is another benefit of the casing spawn of this invention.

EXAMPLE 22

The Inhibitory Effect of High Nutrient Levels on *Agaricus bisporus* Growth

Casing spawn was prepared in 500 ml flasks with varying levels of soybean fines between 10 and 90% and varying levels of Oil-Dri 7/14 brand calcined earth between 10 and 90%. All formulas contained about 0.5% $CaCO_3$ ($CaCO_3$ level is not critical) and were moistened to near saturation. After inoculation with *Agaricus bisporus* strain M8, flasks were shaken and incubated at 25 C. Flasks were shaken at day 7 to distribute the inoculum. Mycelial growth was assessed by color measurement at days 0, 7, and 14.

Figure 1:
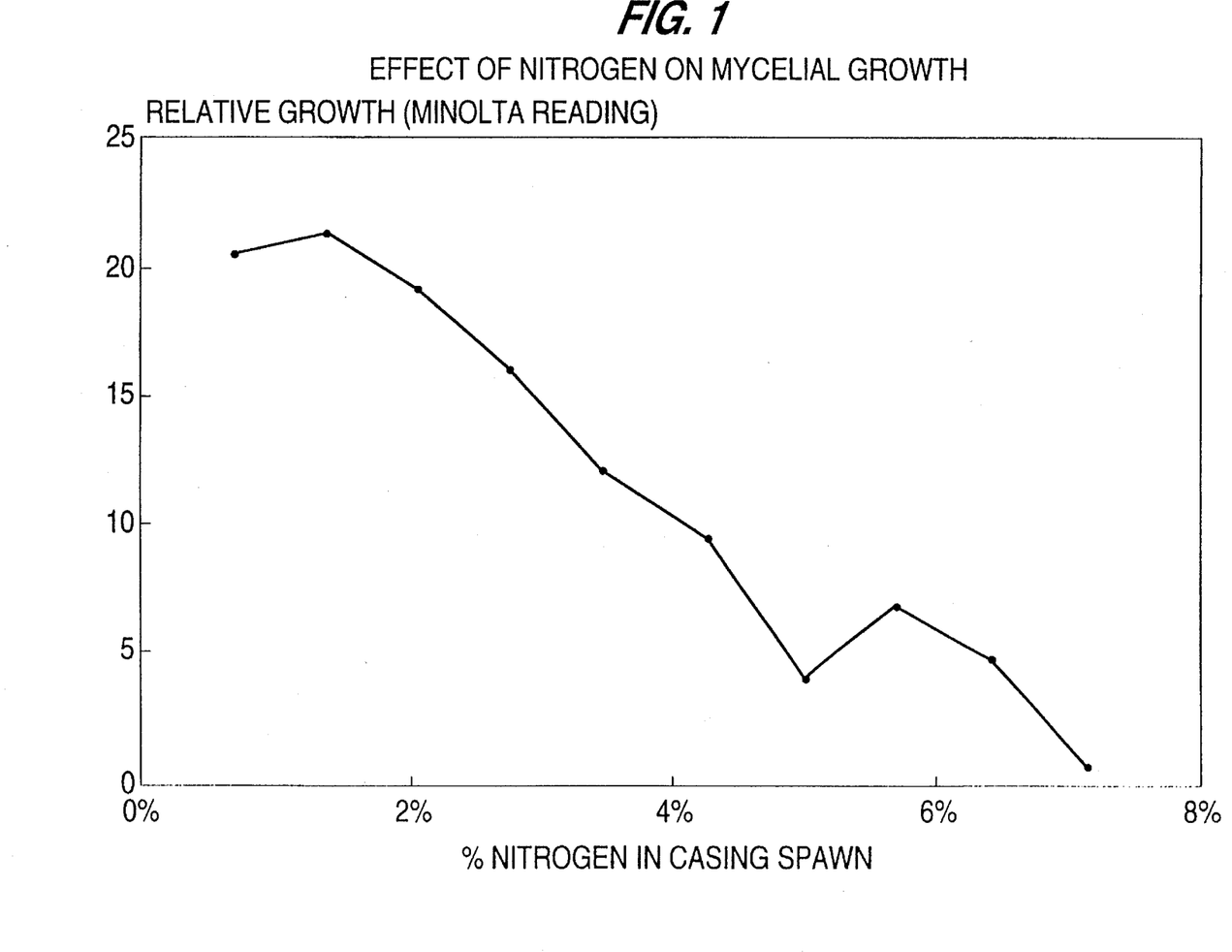
FIG. 1 shows the effect of nitrogen content of the casing spawn formula on *Agaricus bisporus* mycelial growth.

After 14 days of incubation at 25 C, mycelial growth was evaluated colorimetrically using a Minolta Chroma-meter. Well-colonized casing spawn changes from the dark color of the substrate to the lighter color of the Agaricus mycelium, and FIG. 1 shows growth, measured as the difference between the color at day zero and day 14. This Figure shows that higher levels of soybean fines (higher nitrogen contents) substantially reduced the growth of the Agaricus mycelium. Formulations containing less than 20 to 30% soybean fines support luxuriant growth of the mycelium. At higher levels, mycelial growth was restricted, presumably because the nutrient is too rich for the organism.

The texture of the substrate containing high levels of soybean fines was also unacceptable; the fines congealed into a paste-like mass that cannot be readily mixed. It was necessary to pass the formulas containing above about 30% soybean fines through a sieve to break up the paste-like mass.

Figure 2:
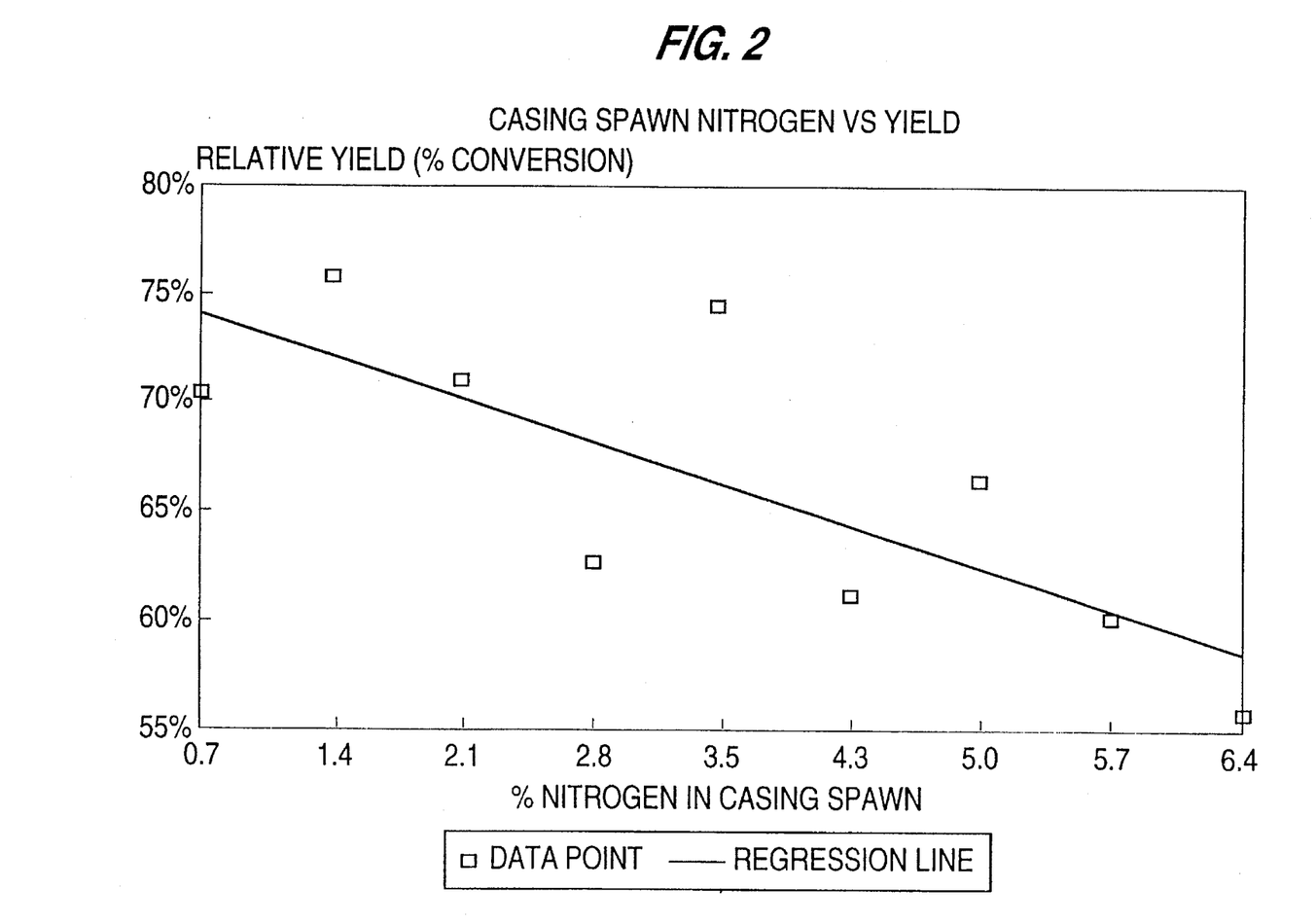
FIG. 2 shows the effect of increased casing spawn nitrogen content on mushroom yield.

A formula containing 30% soybean fines delivers about 0.54 g nitrogen/$ft^2$. When the various formulations were used in casing spawn evaluation trials, those containing greater than 30% soybean fines showed reduced efficacy in supporting mushroom production (FIG. 2). Mushroom yield (expressed as conversion efficiency: fresh weight of mushroom/dry weight of compost) is plotted versus the percent Kjeldahl nitrogen in the formula on dry weight basis. The Figure shows a regression line with a correlation coefficient (R squared)=0.5847, described by the formula:

% Conversion=(% Nitrogen)(−2.70)+0.7604

EXAMPLE 23

The Inhibitory Effect of Nitrogenous Materials in the Casing Layer

In "step 1" trials, sixty-three 0.5 ft$^2$ plastic containers were each filled with 2.85 lb fresh weight (1 lb dry matter) of compost fully colonized with *Agaricus bisporus* mycelium. Compost was hand pressed into the containers, and cased with 2" of sphagnum peat moss casing layer with casing spawn prepared essentially as described in Example 1. Casing layers contained 0.18 g/ft$^2$ of nitrogen contributed by the casing spawn composition, and various samples were amended with varying amounts of soybean fines, casein, NaNO$_3$, or NH$_4$Cl. Containers were treated according to normal procedures to induce mushroom formation.

Figure 3:
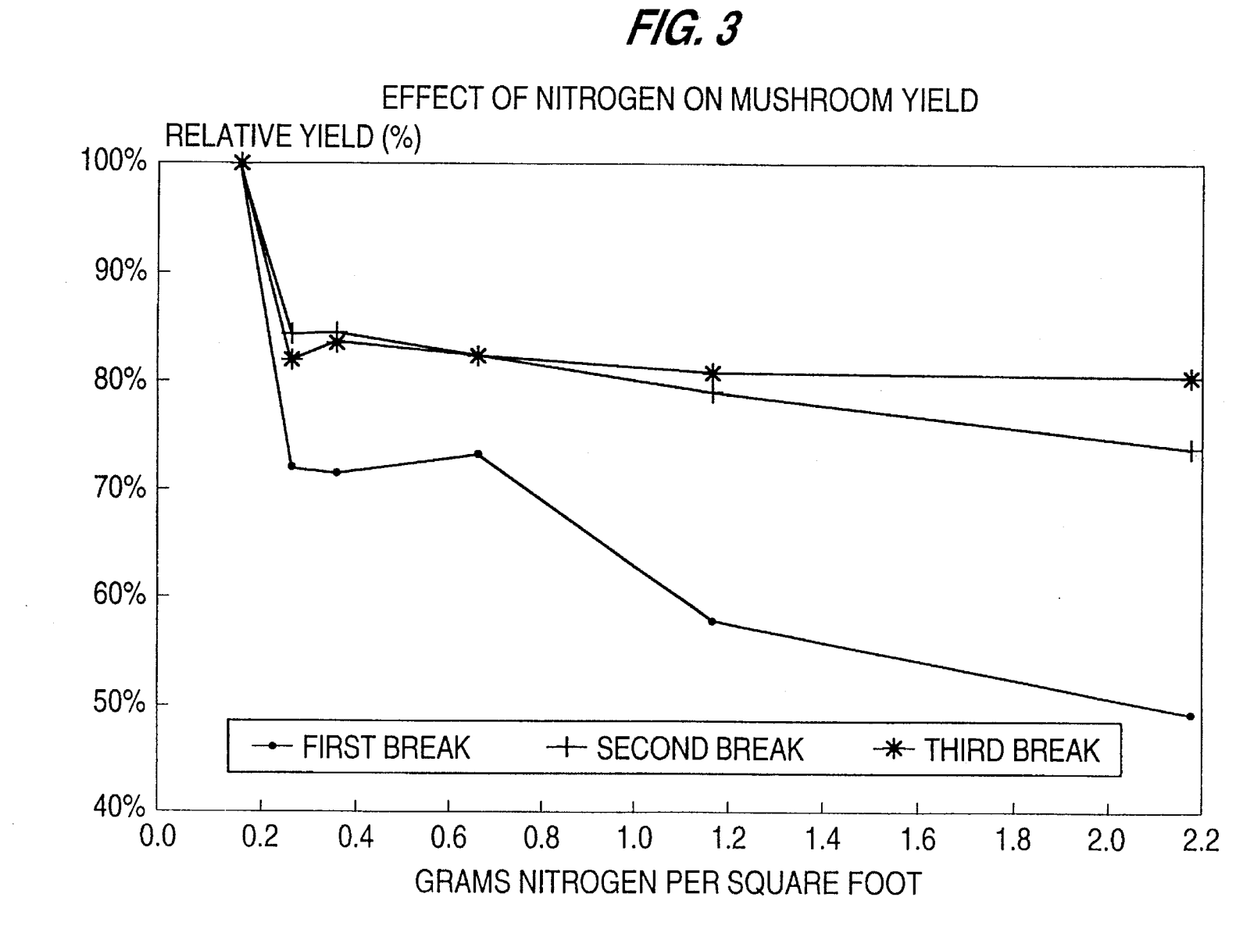
FIG. 3 shows the effect of nitrogen added to the casing layer on mushroom yield.

The results of these tests are summarized in FIG. 3 as mushroom formation. Data show the mushroom yield at the end of the first, second, and third breaks of mushroom production, relative to the yield from beds cased with the casing spawn of this invention, plotted against the amount of nitrogen added to the casing material. The data are similar for the four different nitrogen sources, so the data were averaged for all nitrogen types. It is clear that nitrogen levels above 0.20 g/ft$^2$ are inhibitory to mushroom production.

Casing layers amended with soybean fines also showed heavy growth of various molds, including those of the genera Penicillium and Mucor. Mushroom quality, as subjectively determined, was reduced in all treatments in which the nitrogen content of the casing layer was increased. It is believed that this reduction in mushroom quality is due to populations of bacteria, yeasts, and molds that colonize the casing layer because of the elevated nitrogen content. Such microorganisms can cause discoloration of mushrooms.

EXAMPLE 24

Pilot Plant Trials

The following description is of "step 3" trials using either 16 or 32 trays that are 3'×4' in dimension and contain 60 lb dry matter compost per tray. Intermediate "Step 2" trials consisting of 60 to 120 trays that are 2'×2' in dimension and contain 16 lb dry matter compost per tray were also performed, but the data are not shown.

Approximately 12,000 lb fresh weight of phase I mushroom compost was obtained from the Campbell's Fresh, Inc. Brighton Mushroom Farm, Howe, Ind., following outdoor fermentation (phase I processing). The compost was made from stable bedded wheat straw, fresh wheat straw, poultry litter, cottonseed meal, and gypsum according to standard mushroom growing practices (see, e.g., Fermor et al., 1985, "Compost as a Substrate and Its Preparation," Chapter 6, pp. 81–109, In: P. B. Flegg, D. M. Spencer & D. A. Wood, eds., The Biology and Technology of the Cultivated Mushroom, John Wiley & Sons, Ltd., Chichester, and Gerrits, J. P. G., 1988, "Nutrition and Compost, "Chapter 2, pp. 29–72, In: L. J. L. D. Van Griensven, Editor, The Cultivation of Mushrooms, Darlington Mushroom Laboratories, Ltd., Sussex, England). The compost was analyzed for moisture content, and an amount equal to 66 lb dry matter was placed in each of 32 wooden trays measuring 4'×3'× 8". Compost was pasteurized (phase II processing) according to practices well known in the mushroom industry (Fermor et al., 1985).

Following the nine day phase II process, trays were tipped onto a tray handling line, and the compost weight was adjusted to 60 lb dry matter per tray. *Agaricus bisporus* strain M8 rye spawn (817 g, 3% of compost dry weight) and Campbell's Fresh S41 compost supplement (1,090 g, 4% of compost dry weight) were added to the surface of the compost. The compost and additives were thoroughly mixed by the tray handling line, and mixtures were returned to the trays, covered with plastic sheets, and hydraulically pressed to compress the compost. Trays were moved to spawn run rooms and stacked according to a completely random design. Compost temperatures were maintained at about 78 F by varying air temperatures and air circulation for the duration of the 13-day spawn run period. The relative humidity in the room was maintained at 95% and no fresh air was introduced.

At the completion of spawn run, trays were removed from the rooms and again hydraulically pressed to compress the compost. Plastic coverings were removed, and the compost was top-dressed with 2" of a sphagnum peat moss casing layer amended with various casing spawn or CACing treatments. The casing layer was prepared by mixing 4 cubic foot (compressed) bales of Fison's Sunshine brand sphagnum peat moss with agricultural lime and water in a ribbon blender. Agricultural lime was added at 25% on the dry weight of the peat, and water was added as needed to achieve the desired moisture content (generally 76 to 78%).

After the mixture was fully hydrated and was homogeneous in texture, casing spawn prepared as described in Example 1 was added at rates equal to 0.08, 0.16, 0.25, and 0.33 lb of casing spawn per square foot of casing area. The amended casing materials were mixed for 3 to 5 minutes, and the mixtures were evenly spread over the surface of the compost. Four trays were cased for each casing spawn level. An additional four trays per treatment were cased ("CACed") with casing material amended with fully colonized mushroom compost at 0.16, 0.25, 0.33, or 0.42 lb of compost per square foot of casing area. The levels of compost mixed in with the casing layer were based on previous experience with the CACing process.

Following the casing operation, trays were stacked in cropping rooms according to a completely random design. Compost temperatures were maintained at about 80 F by varying air temperature and air circulation. The surface of the casing was lightly watered as needed to increase the casing moisture content to about 85%. After 5 days, the casing layer was subjectively determined to be well colonized with *Agaricus bisporus* mycelia. The room was "flushed" by introducing fresh air, lowering the compost temperature to about 68F, and lowering the relative humidity to about 85% to encourage evaporational cooling. Air temperatures were reduced to about 64 F, or as needed to reduce the compost temperature to about 68 F. Beds were generally not watered for several days after flushing. After 4 to 5 days, mushroom primordia began to appear on the surface of the compost. Environmental conditions were maintained, and the casing layer was periodically watered as needed.

The results of this experiment are shown in Table 1. The optimum rate for the casing spawn is between 0.08 and 0.16 lb/ft$^2$. At levels above 0.16 lb/ft$^2$, mushroom yield is reduced, although the reduction is not statistically significant. Although mushroom quality (measured as color change with time during incubation at 45 F) shows a drop at the 0.25 lb/ft$^2$ casing spawn rare, the mushroom shelf life at the 0.33 lb/ft$^2$ rate is not significantly different from that at the lowest casing spawn use rates. The optimum rate for CACing with colonized compost is between 0.25 and 0.33 lb/ft$^2$. Mushroom shelf life is significantly reduced with compost use rates above 0.25 lb/ft$^2$. In this trial, the mushroom yields using the casing spawn were slightly less than the yields using compost as a CACing material. The difference was not statistically significant. In other trials, casing spawn yields are higher than yields with CACing material. Over the course of several trials, the differences have been negligible.

TABLE 1

EFFECT OF CASING SPAWN AND CACing WITH COMPOST ON MUSHROOM YIELD AND QUALITY

| TRT No. | Casing Treatment | Use Rate (Lb/sq ft) | Mushroom Yield (Lb/sq ft) | Yield Stats | Shelf Life (Days) | Shelf Life Stats |
|---|---|---|---|---|---|---|
| 1 | CAC with compost | 0.16 | 5.03 | AB | 3.3 | AB |
| 2 | CAC with compost | 0.25 | 5.45 | A | 3.5 | A |
| 3 | CAC with compost | 0.33 | 5.40 | A | 2.2 | C |
| 4 | CAC with compost | 0.42 | 5.03 | AB | 1.8 | C |
| 5 | Casing spawn | 0.08 | 5.13 | AB | 3.4 | A |
| 6 | Casing spawn | 0.16 | 5.08 | AB | 3.7 | A |
| 7 | Casing spawn | 0.25 | 4.88 | AB | 2.3 | BC |
| 8 | Casing spawn | 0.33 | 4.69 | B | 3.3 | AB |

In statistics columns, values with the same letter are not significantly different at the 0.05 level.
Shelf life is based on the time to reach unacceptable quality during incubation at 45 F. Quality is assessed with a Minolta Chroma-meter, and unacceptable quality is arbitrarily defined according to color.

EXAMPLE 25

Typical Use of Casing Spawn on a Tray Farm

A mushroom compost based on a horse manure formula prepared according to usual cultivation practices was filled into wooden trays. The compost was subjected to a nine day "phase II" pasteurization process. Upon cooling, compost was inoculated with *Agaricus bisporus* strain M8 growing on rye spawn. Compost was incubated in spawn run rooms at moderate temperatures for 13 days to allow thorough colonization by the mushroom fungus. At the completion of the process, trays were removed from spawn run rooms, hydraulically pressed to compress the compost, and top-dressed with a casing mixture of sphagnum peat moss and spent lime (lime previously used as a filtering agent during sugar refining). The casing mixture was previously hydrated to 78 to 80% moisture, and amended with casing spawn prepared according to Example 1 at a rate of 3.0 lb per four cubic foot bale of compressed peat. Based on typical peat use rates, this corresponds to about 0.05 lb of casing spawn per square foot of tray added to each tray to a depth of two inches. Trays were incubated at up to 78 F compost temperature, up to 95% relative humidity, and with carbon dioxide level as high as practicable. The surface of the casing layer was watered as needed to achieve and maintain a 80 to 85% moisture level in the mixture. During this incubation period, mycelia grew into the casing layer from the compost and casing spawn particles as described previously. Hyphal anastomosis was essentially complete within 4.5 days.

Environmental conditions in the cropping room were altered to reduce air and compost temperatures to 64 and 68 F, respectively. Relative humidity was reduced to about 85%, and carbon dioxide concentration in the air was reduced to approximately 1200 ppm. These environmental changes induced the differentiation process, and mushroom primordia began to form within 3–4 days. Mature mushrooms formed over the surface of the casing mixture. The first mushrooms were harvested 16 days after casing, and the peak mushroom production occurred on the eighteenth day after casing.

We claim:

1. A synthetic mushroom casing spawn composition, consisting essentially of:

10–99 dry wt % of calcined earth made of a nutritionally inert, porous, insoluble, mineral-based particulate material that is effectively devoid of available carbon and nitrogen compounds and exhibits no residual organic material and sufficient water to saturate the nutritionally inert particulate material to near its maximum water holding capacity while retaining a free flowing particulate character:

1–20 dry wt % nutrient particles selected from the group consisting of cracked soybeans, soybean fines, rye grain, cottonseed meal, corn meal, corn dust, ground corn, Navy bean outfall, sunflower seed fragments that provide a Kjeldahl nitrogen at a level within the range of 0.3–1 dry wt %; and

*Agaricus bisporus* mushroom mycelia but substantially free of all organisms other than said mushroom mycelia.

2. A composition according to claim 1 wherein said composition consists essentially of 10–99 wt % inert particles; 1–20 wt % nutrient particles; and 35–60 wt % water.

3. A composition according to claim 1 wherein said composition consists essentially of 35–55 wt % inert particles; 5–15 wt % nutrient particles: and 40–50 wt % water.

4. A composition according to claim 1 further containing a material capable of balancing the casing spawn pH in the range of neutral to slightly alkaline pH.

5. A composition according to claim 1 wherein said composition is in a particulate form with an average particle size between 0.5 and 10 mm.

* * * * *